July 26, 1932. W. H. BOYCE 1,868,723
INSULATING SUPPORT
Filed Oct. 13, 1928 7 Sheets-Sheet 1

Witness:
William P. Kilroy

Inventor:
William Howard Boyce
By Brown Jackson Boettcher & Dienner
Attys

Inventor:
William Howard Boyce

July 26, 1932. W. H. BOYCE 1,868,723
INSULATING SUPPORT
Filed Oct. 13, 1928 7 Sheets-Sheet 3

Witness:
William P. Kilroy

Inventor
William Howard Boyce

July 26, 1932.  W. H. BOYCE  1,868,723
INSULATING SUPPORT
Filed Oct. 13, 1928   7 Sheets-Sheet 4

Witness:
William P. Kilroy

Inventor:
William Howard Boyce

July 26, 1932.  W. H. BOYCE  1,868,723
INSULATING SUPPORT
Filed Oct. 13, 1928    7 Sheets-Sheet 5

Inventor
William Howard Boyce

July 26, 1932.  W. H. BOYCE  1,868,723
INSULATING SUPPORT
Filed Oct. 13, 1928    7 Sheets-Sheet 7

Inventor
William Howard Boyce
By Maury Jackson Pritcher
& Denner.
Attys.

Patented July 26, 1932

1,868,723

UNITED STATES PATENT OFFICE

WILLIAM HOWARD BOYCE, OF CHICAGO, ILLINOIS, ASSIGNOR TO THE DELTA-STAR ELECTRIC COMPANY, OF CHICAGO, ILLINOIS, A CORPORATION OF ILLINOIS

INSULATING SUPPORT

Application filed October 13, 1928. Serial No. 312,387.

My invention relates to insulating supports and particularly to suspension or strain insulators and bus or rail supports.

In such devices as specified, the strain on the insulating element is relatively great, for the reason that the entire load is carried thereby. Insulating materials such as porcelain and the like do not have great tensile strength, and difficulty has been encountered in providing an insulating support having a high tensile strength while using insulating materials with low tensile strength.

It is well known that porcelain and the like materials have great compression strength and I propose to so arrange porcelain and other insulating materials in such combinations and arrangements that the insulating material is subjected to compressive strain while the insulating support as a whole has great tensile strength.

The object of my invention is, therefore, to provide such a device in which the insulator is afforded better protection from the weather than heretofore provided, to provide full floating suspension for the rail or conductor supported and provide adjustment for leveling the same.

Another object of my invention is to provide relatively yieldable material to equalize bearing surfaces and thereby avoids surface stresses in both castings and insulators.

Other objects and advantages will hereinafter appear.

In carrying out the objects of my invention, I provide an insulating support comprising a metallic cup or shell arranged to accommodate an insulating member. The lower portion of the cup is formed into a conical seat on which the lower conical face of the insulator rests. Relatively yielding material is interposed between the seat and the insulator in order to prevent surface stresses and chipping of the enamel, breakage of the insulator or of the metal part.

The insulator is preferably provided with an opening downwardly through the center, and a concave bearing surface on the upper side for receiving the head of the stressing element or bolt, which supports the rail or conductor as the case may be. Various forms of rail or conductor supports may be employed, and I preferably provide an arrangement whereby the rail is afforded universal floating movement within predetermined limits.

In order that others may understand and be able to employ my invention, I have illustrated in the accompanying drawings insulating supports incorporating the preferred form thereof.

The arrangement shown in Figures 1 to 8, inclusive, is intended for the floating support of a contact rail 10 shown in dotted outline and comprises a metal cup 11 having an opening 12 through the bottom. The remainder of the bottom portion consists of a conical bearing flange 13 having a lead or other soft metal gasket 14 fitted thereon and adapted to receive the weight of the insulator 15 and the strain exerted thereby.

Figures 1, 3, 4:
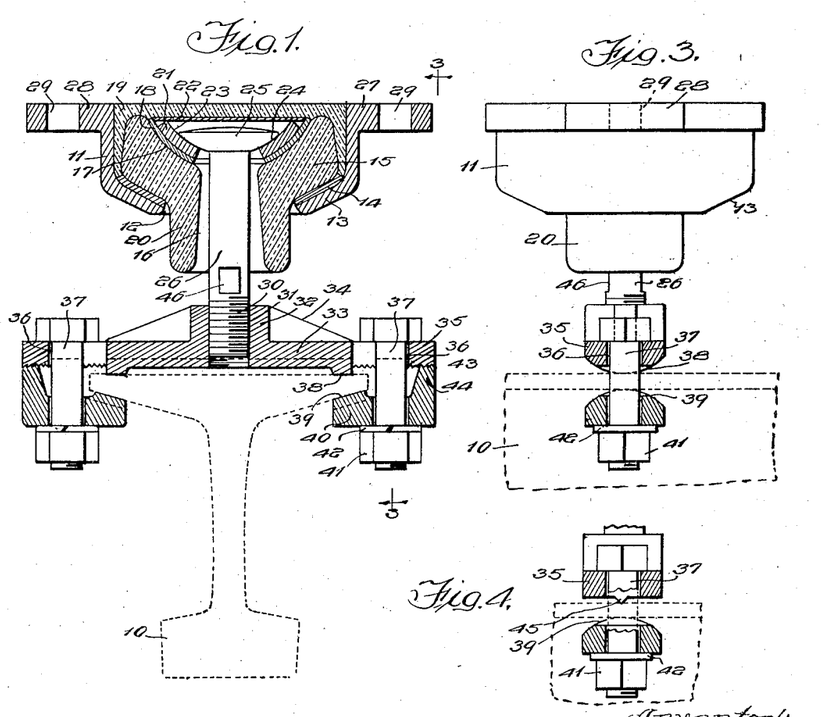
Fig. 1 is a cross sectional view of an insulating support incorporating my invention and arranged for supporting an electric contact rail of the under-slung type.
Fig. 3 is an elevational view partly in section taken on the line 3—3 of Figure 1.
Fig. 4 is a sectional view similar to the lower portion of Figure 3 but showing a modified form thereof.
Figure 2:
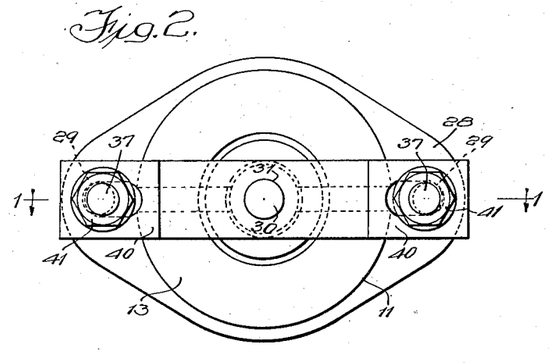
Fig. 2 is a top plan view of the supporting arrangement shown in Figure 1.

The insulator 15 may be of porcelain or the like material and is of such size and shape as to loosely fit within the cup 11 leaving a margin around the sides and top which may be filled with a suitable insulating compound 19. A skirt 20 on the lower end of the insulator extends downwardly through the opening 12 in the cup and the same is provided with a downwardly extending opening 16. The opening or passageway 16 leads from a socket 17 in the upper side of the insulator. A gasket 18 is fitted within the socket 17 of the insulator and is arranged to receive thereon a metal washer 21 which is provided with a semi-circular upper face 23 adapted to be engaged by a similarly shaped convex outer surface 24 of the head member 25 which is integral with the stress bolt 26 extending down through the passageway 16 and being of such size that a relatively wide margin remains about the bolt for permitting oscillation of the bolt in any direction within predetermined limits.

Above the head 25 of the bolt 26 and across the upper end of the washer 21 extends a disc 22 of any suitable insulating material, which prevents the insulating compound from engaging onto the head 25.

By this arrangement, it will be noted that the top is adequately sealed from the weather and the gaskets 14 and 18 provide relatively yielding contacts for the insulator which prevents excessive surface strain thereon. The cup 11 is provided with ears 27 and 28 through which are openings 29 adapted to receive bolts or other suitable supporting mechanism.

The lower end of the stress bolt 26 is threaded at 30 and has screw thread engagement with the inner side of the boss 32 in the opening therein provided as shown at 31. The boss 32 is integral with the cross bar 33 arranged to support the contact rail. Flanges 34 extend from the boss longitudinally of the cross bar 33 for reinforcing the same. The end portion 35 of the cross bar 33 is provided with openings 36 therein through which may be inserted the supporting bolt 37. Gripping members 38 are formed on the lower side of said end portion and are rounded as shown in Figure 3 for permitting longitudinal expansion or drift of the rail. A companion gripping element 40 provided with gripping surface 39 is arranged on the bolt 37 below the portion 35 and is held in contact with the flange of the rail by means of the nut 41 and the lock washer 42 on the lower end of the bolt 37. Serrated edges 43 on the portion 35 and the element 40 are provided in order to hold the elements in the desired adjustment for different sized rails such as 10, and to give the desired adjustment of the gripping portions 38 and 39 on the flange of a rail as shown in Figure 1.

In Figure 4 is shown a gripping element 45 on the end portion 35 and the same is triangular in form having the apex in engagement with the flange of the contact rail, thereby anchoring the rail to the member 35 and permitting rolling contact on the gripping member 39 such that limited longitudinal drifting is permitted when the bolt 26 is oscillated to a slight extent as is permitted by the opening 16 through the insulator 15 as hereinbefore set forth. An opening 36 through the stress bolt 26 is provided for the insertion of a key or bar for the purpose of rotating the bolt 26 and thereby adjusting the cross bar 33 vertically on the threaded portion of the bolt 26 in order that the rail may be kept in proper alignment vertically for best operating condition.

Figures 5, 6:
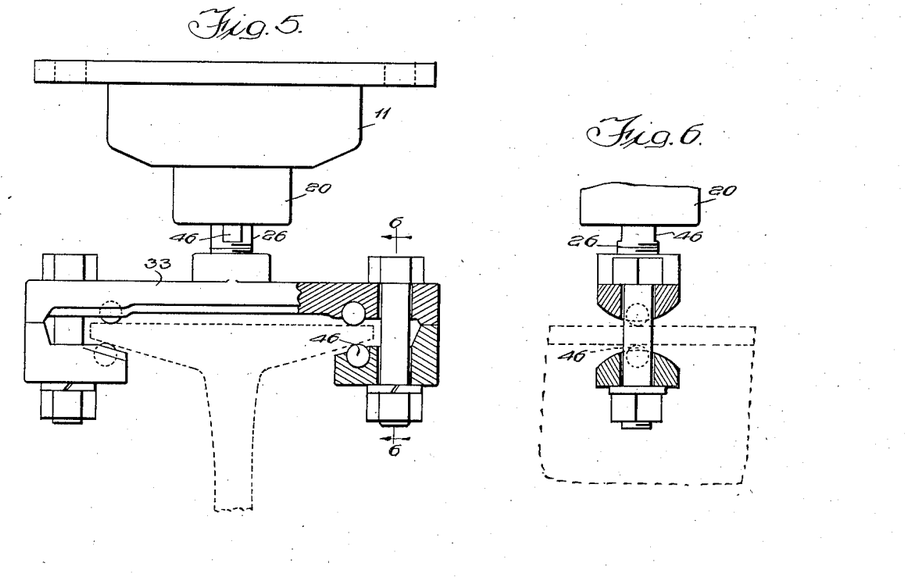
Fig. 5 is a view partly in section similar to that shown in Figure 1 but illustrating a modified form of rail gripping means for permitting longitudinal movement of the rail.
Fig. 6 is a sectional view taken on the line 6—6 of Figure 5.
Figure 7:
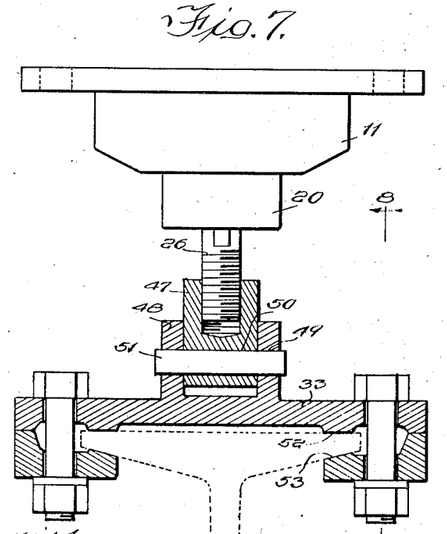
Fig. 7 is a sectional view similar to Figure 5 but illustrating another form of rail supporting and pivoting means.
Figure 8:
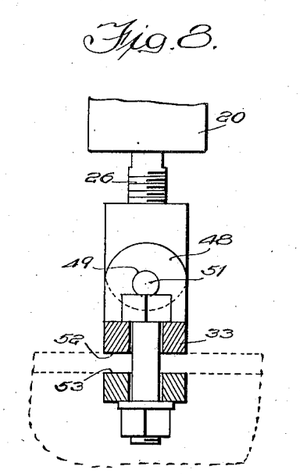
Fig. 8 is a sectional view taken on the line 8—8 of Figure 7.

The arrangement shown in Figures 5 and 6 is the same as that shown in Figure 1 with the exception that steel balls 46 are provided for gripping the flanges of the contact rail, and permitting longitudinal movement of the rail. In Figures 7 and 8 is shown the same arrangement as that heretofore described except that the stress bolt 26 has threaded engagement in an opening in the upper end of a stud member 47 which is fitted between upwardly extending ears 48 on the cross bar 33 as shown in Figure 7. Openings 49 are provided in the ears 48 and a similar opening 50 is provided in the stud 47. The openings 49 and 50 are aligned and a pivot pin 51 is positioned therethrough for permitting the cross bar 46 and the mechanism connected therewith to oscillate on the pivot pin 51. In this arrangement, it will also be noted that the rail flanges are engaged by gripping members 52 and 53 which have plane engaging surfaces in contact with the rail flanges for the purpose of permitting the rail to slide therebetween.

Figure 9:
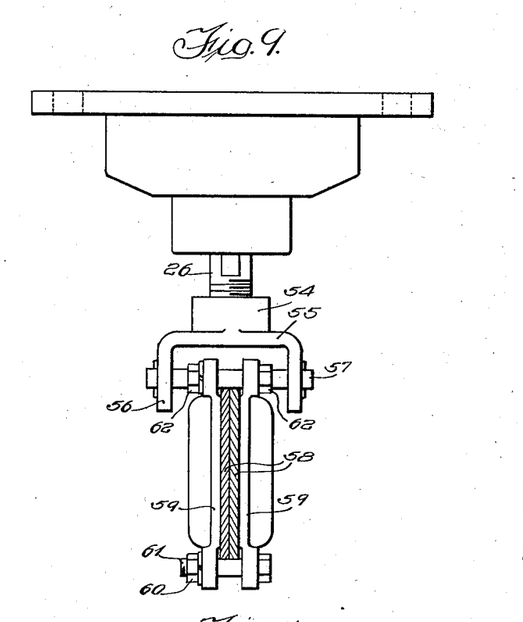
Fig. 9 shows the insulating support illustrated in Figure 1 adapted and arranged for supporting a flat bus with the bars positioned in a vertical plane.
Figure 10:
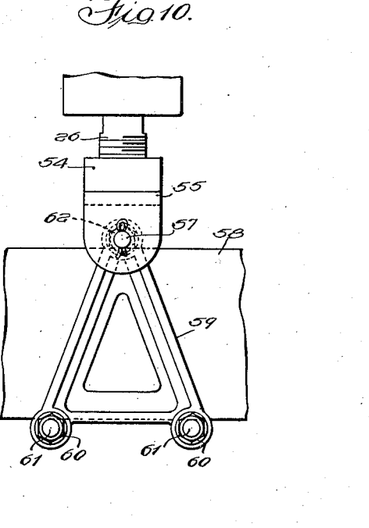
Fig. 10 is a side elevational view of that shown in Figure 9.

Figures 9 to 14, inclusive, show an insulating support identical with that shown in Figure 1, but showing also its adaptation to various forms of buses. In Figures 9 and 10 the stress bolt 26 has threaded engagement in a boss 54 on the cross member 55 which is provided with downwardly extending portions 56 arranged to receive a pivot pin 57 through the same. The conductors 58 are vertically positioned and secured between the clamping members 59 which are held in clamping engagement with the bars or conductors 58 by means of nuts 60 on the bolt 61 and the nuts 62 on the pivot pin 57. Suitable lock washers 63 may be positioned beneath the nuts 60 and 62 if desired in order to insure the locking action of the nut.

Figure 11:
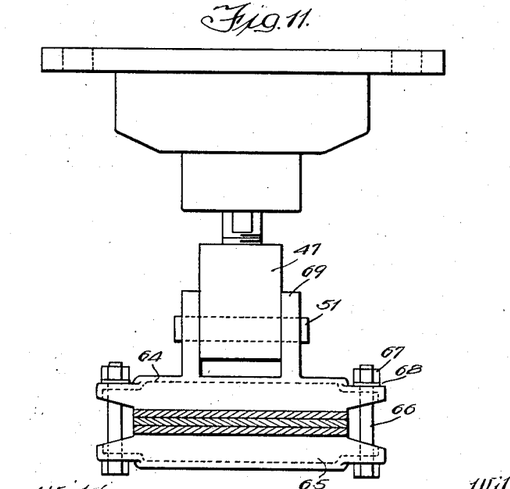
Fig. 11 is an elevational view similar to Figure 9 showing the insulating support arranged for supporting a flat bus with the bars positioned in a horizontal plane.
Figure 12:
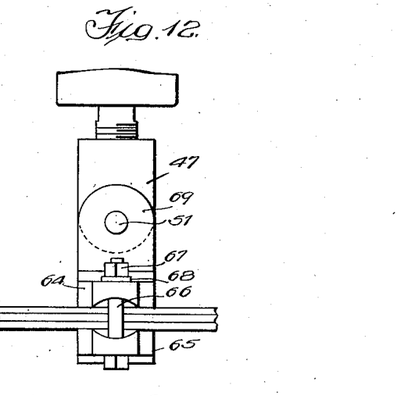
Fig. 12 is a side elevational view of that shown in Figure 11.

In Figures 11 and 12 the conductors are in a horizontal plane as shown and are secured together by means of clamping members 64 and 65 which are held in place by bolts 66 having nuts 67 and washers 68 thereon. Ears 69 are integral with and extend upwardly from the clamping member 64 and are provided with openings through which the pivot pin 61 is arranged to pass. The pivot pin 51 thereby pivotally secures the clamping arrangement to the stud 47 and permits limited longitudinal movement of the bus.

Figure 13:
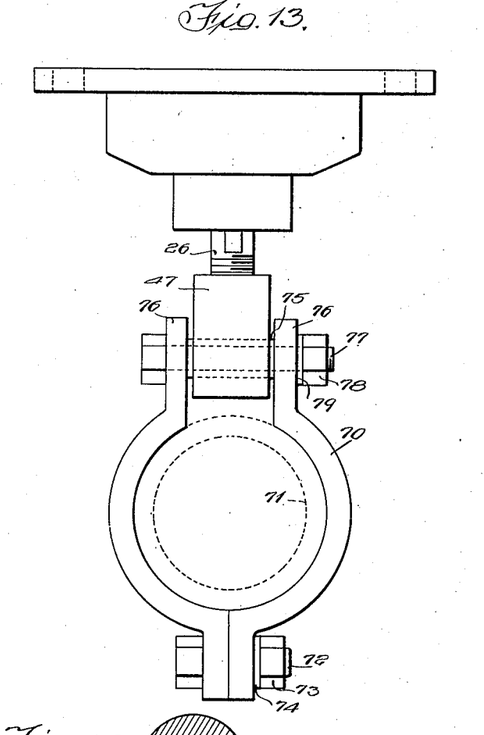
Fig. 13 is an elevational view of the insulator and supporting arrangement shown in Figures 3, 5, 9, and 11 and showing the same arranged for supporting a cylindrical bus or conductor.
Figure 14:
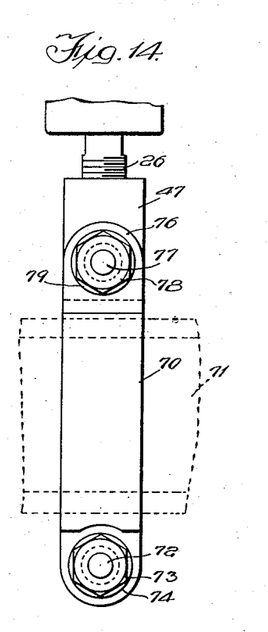
Fig. 14 is a side elevational view of that shown in Figure 13.

In Figures 13 and 14 is illustrated another form of conductor clamp comprising arcuate members 70 secured together in clamping engagement with the cylindrical conductor 71 by means of a bolt 72 passing through the lower ends thereof and having a nut 73 and a lock washer 74 thereon. The bolt 26 is secured in the upper end of the stud 47 in the manner heretofore set forth. The stud 47 is provided with an enlarged opening through which a bushing 75 is fitted and extending a short distance beyond both ends of the opening and arranged to be engaged by upwardly extending lugs on the clamping member 70.

These lugs 76 are provided with an opening smaller than the diameter of the bushing 75 and adapted to receive a bolt 77 therethrough having a nut 78 and a lock washer 79 thereon for securing the lug 76 in clamping engagement with the bushing 75 thereby holding the conductor 71 securely between the clamping members and permitting a limited amount of longitudinal movement through the medium of the pivot bolt 77 and the oscillatory movement of the bolt 26 in the passageway 16 of the insulator 15 as described in reference to Figure 1.

Figure 15:
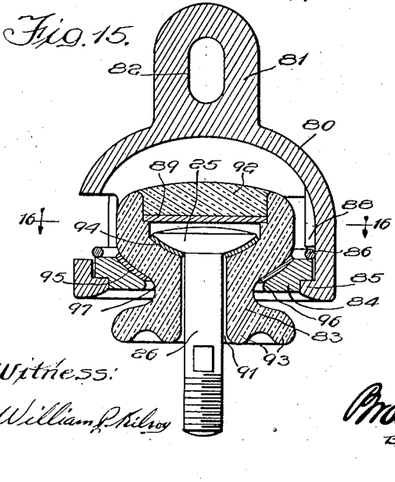
Fig. 15 is a vertical sectional view of a modified form of my invention in which is employed a one piece housing.
Figure 16:
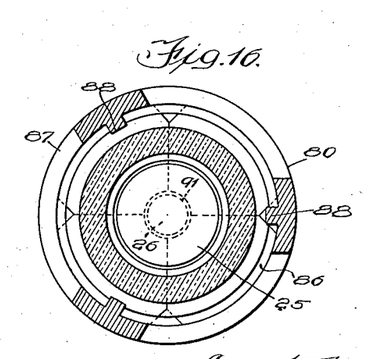
Fig. 16 is a cross sectional view taken on the line 16—16 of Figure 15.

Figures 15 and 16 show a modified construction of my invention comprising a one piece housing combination for a strain insulator unit. The housing 80 is of an inverted cup shape and having an upwardly extending lug 81 having an opening 82 therein and through which the cable or other stressing element is adapted to be received when the strain insulator unit is in use. The housing is provided with an opening in the lower side of sufficient size for permitting the insulator element 83 to be inserted therethrough. The housing is also provided with a plurality of openings near the lower side through which segments may be inserted for supporting the insulator in the manner shown in Fig. 15. The segments 84 are seated on an inwardly extending flange 85 of the housing member 80 and a spring member 86 is then inserted through one of the openings 87 and locks the segments 84 in place by engagement between the upper side thereof and the lower side of inwardly extending lugs 88. A suitable disc 89 is seated on a shoulder 90 of the insulator 83 and is thereby held above the head 25 of the stress bolt 26 which passes through the opening 91 in the porcelain insulator. A suitable insulating compound 92 is used to fill up the space above the disc 89 between the upper edges of the insulator. The lower side of the insulator 83 is provided with corrugations 93 for making better protection against the weather.

A resilient gasket 94 is interposed between the head 25 of the bolt 26 and the insulator and a similar gasket 95 is interposed between the lower side of the insulator and the supporting segments 84. A space is provided between the inner edge 96 of the segments and the neck 97 for permitting limited oscillation of the bolt 26 together with mechanism which may be connected therewith.

Figure 17:
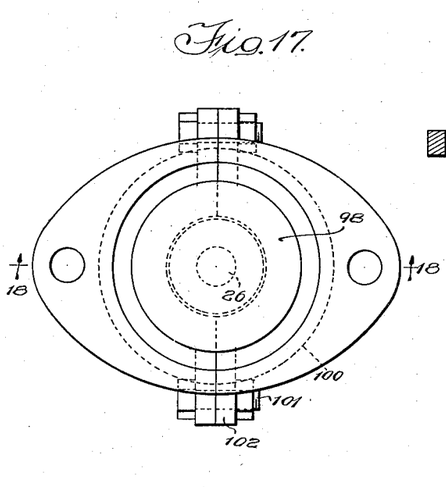
Fig. 17 is another modification of my invention in which the housing or cup member is provided in two parts.
Figure 18:
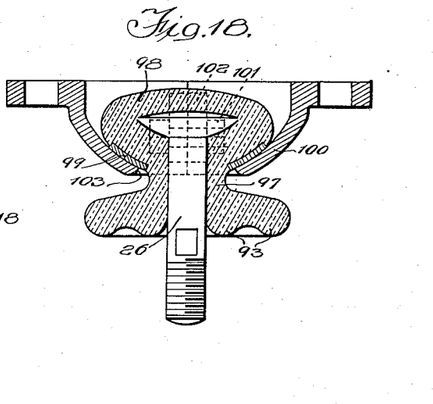
Fig. 18 is a sectional view taken on the line 18—18 of Figure 17 and showing the insulator molded directly around the supporting stud or stress member.

In Figures 17 and 18 is shown another form of the insulator assembly in which the insulator 98 is of bakelite or similar material and is moulded directly on the head of the bolt 26 and is provided with an insert washer 99 seating in the cup member 100 which is made in two pieces bolted together by bolts 101 through lugs 102 on the sides thereof as best shown in Figure 17. Oscillation of the insulator is permitted, since the opening 103 in the bottom of the cup is larger than the neck 97 of the insulator.

Figure 19:
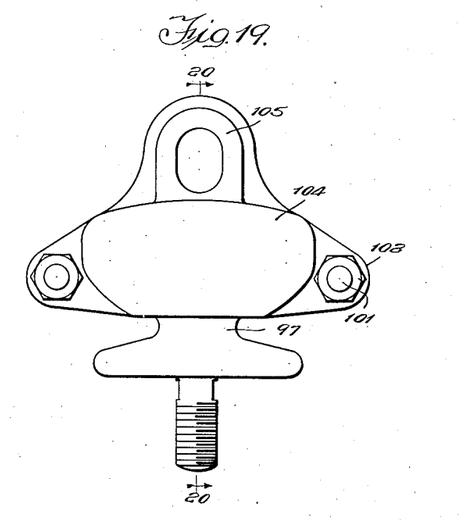
Fig. 19 is an elevational view of another form of my invention.
Figure 20:
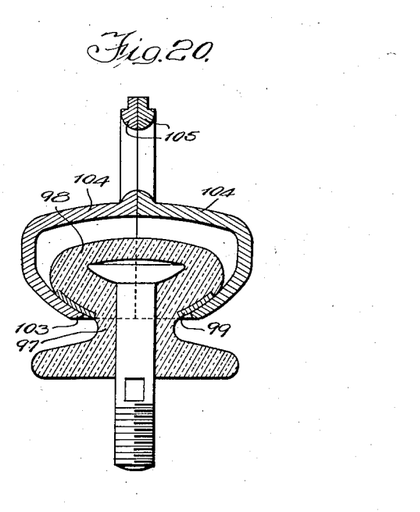
Fig. 20 is a sectional view taken on the line 20—20 of Figure 19.

Figures 19 and 20 illustrate an arrangement in which the insulator is moulded in the same manner as that shown in Figure 18 and the general construction thereof is the same except that the cup member 104 is not open at the top, but is split into two halves which extend together over the insulator and are provided with eye members 105 arranged to be engaged by a cable or the like for the purpose of employing the assembly as a strain insulator. Bolts 101 secure the halves 104 of the cup member together and about the insulator 98 in the same manner as shown in Figure 18.

Figure 21:
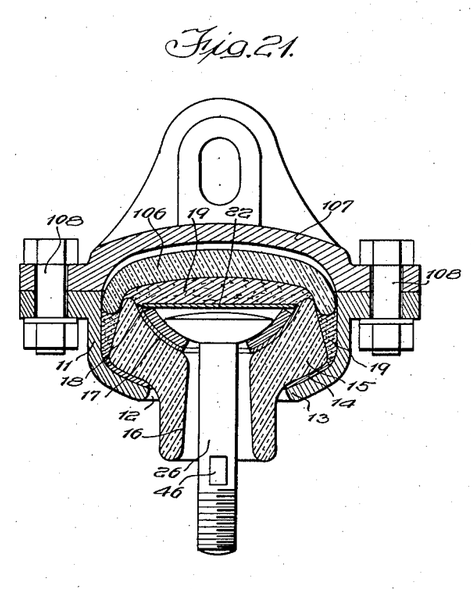
Fig. 21 is a vertical sectional view of another form of my invention showing a strain insulator.

Figure 21 shows another form of strain insulator assembly in which porcelain may be employed for the insulating element. The parts of this assembly are substantially identical with that shown in Figure 1 with the additional element 106 which is a porcelain cap member over the main insulator 15 and the metallic cap 107 over the entire assembly and secured to the cup 11 by bolts 108. The cap 107 is equipped with an integral eye arranged to be engaged by suitable strain transmitting elements.

Figures 22, 24, 25:
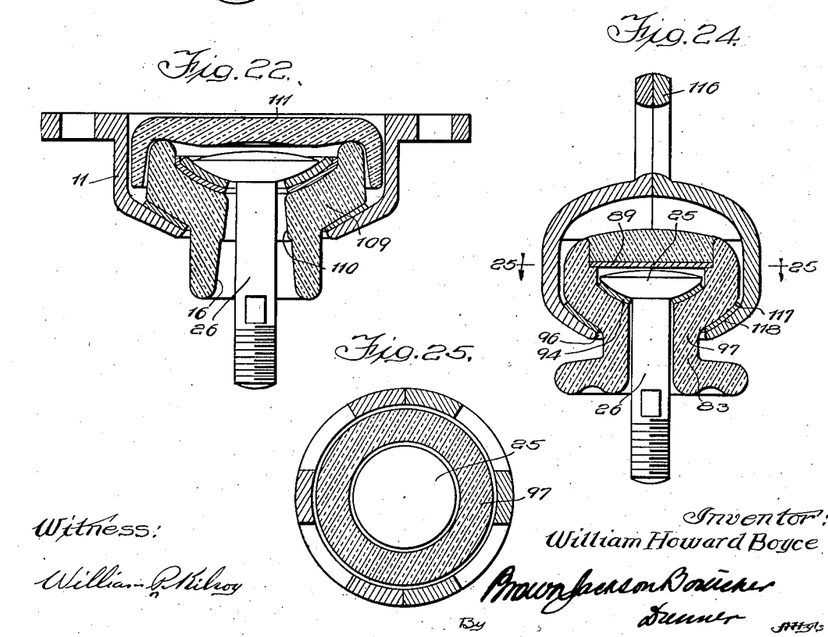
Fig. 22 is a vertical sectional view showing another modification of my invention.
Fig. 24 is a vertical sectional view of that shown in Figure 23.
Fig. 25 is a cross sectional view taken on the line 25—25 of Figure 24.

Another modification is shown in Figure 22 in which the insulator element 109 is provided with an annular shoulder 110 on the inside of the passageway 16 such that upon oscillation of the bolt 26 to its limit, it will engage the shoulder 110 and not transmit any strain to the skirt portion 20.

On the upper edge of the insulator element is positioned a porcelain cap 111 which is substantially flat on top and is intended to shield the metal part within the insulator element. Except for the features herein set forth, this construction is substantially like that shown in Figure 1 with the insulating sealing compound omitted and the porcelain cap 111 substituted.

Figure 23:
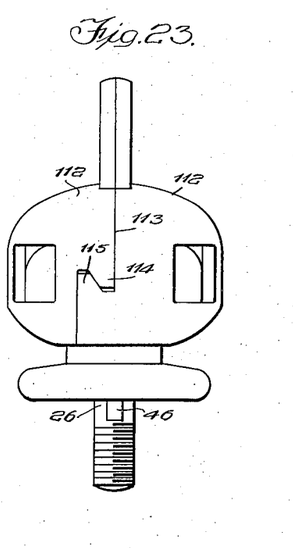
Fig. 23 is an elevational view of another form of my invention.

In Figures 23, 24 and 25 is shown another form of strain insulator assembly comprising an insulator 83, a bolt 26 assembled and sealed therein by the insulating compound 92 in the manner shown in Fig. 15, the distinguishing feature of this modification being the housing 112 which is split at 113 along the axis of the bolt 26 and so designed that both halves of the housing lock about the porcelain insulator and are held in engagement with each other by means of the cooperating lugs 114 and 115 as shown in Figure 23.

As the eye 116 is split, one half thereof being on each portion of the housing, a hook or cable arranged through the eye when in use will hold said lugs in locking engagement.

A gasket 117 is interposed between the insulator and the seat 118 for preventing surface stresses on the insulator and the metal members. In this combination also, I have provided for oscillatory movement of the bolt and insulator units, by making the opening 96 through the bottom of the cup or housing larger than the neck portion 97 of the insulator element 83.

Figure 26:
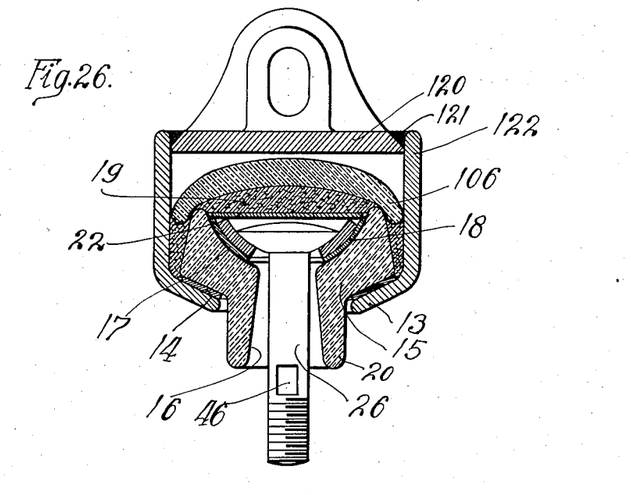
Figure 26 is a vertical section of a modified form of my invention wherein the parts are welded together.

The modification shown in Figure 26 is in general similar to that shown in Figure 21, the similar parts being indicated by the same reference characters. In this form of my invention the parts are assembled as before and metal is then welded along the chamfered edge at 121 to weld the lower flange 122 and the cap 120 together.

Figure 27:
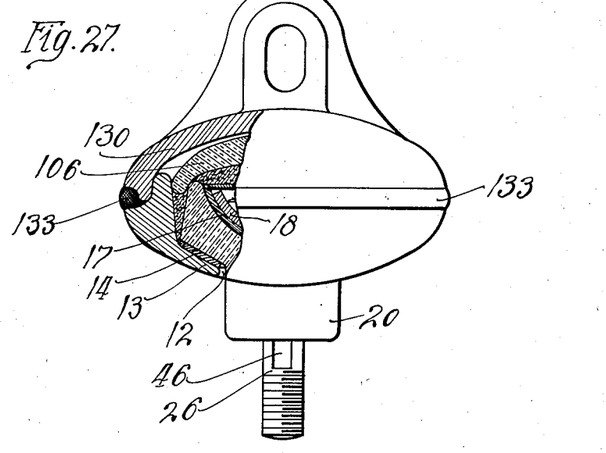
Figure 27 is another modification showing a welded form of strain insulator.

Figure 27 shows another form of my invention, also similar to that shown in Figure 21, and differing from that shown in Figure 26 in that a different form of cap 130 is here used. The cap 130 overlaps the lower flange 132 the two being permanently secured together by a strip of metal 133 welded to the cap and the flange along the chamfered edge between the two.

It will be readily understood by those skilled in the art that this invention is capable of modification without departing from the spirit thereof and I do not intend to be limited to the details herein set forth but desire to avail myself of such variations as come within the scope of the appended claims.

I claim:

1. An insulating support, comprising in combination a supporting housing having a conical seat portion, an opening through the bottom of said housing, an insulator in said housing supported by said seat portion and having a weather shield extending through said opening, a socket in the upper side of said insulator, a passageway from said socket downwardly through said insulator, a bolt in said passageway having a head disposed within said socket, said bolt being arranged to suspend a conductor beneath said insulator, a washer engaged by said head, and relatively yielding gaskets arranged to prevent surface stresses on said insulator.

2. A conductor supporting device, arranged to permit floating action of the conductor, comprising a supporting housing, an insulator therein having a portion extending through the bottom thereof, a concave socket in said insulator, a bolt supported in said socket and passing through an opening in said insulator and extending beyond the bottom end thereof, means for permitting relative movement of said bolt and said insulator, and means for preventing surface stresses on said insulator.

3. An insulating support for an electric conductor, comprising in combination an insulator having a socket in the upper side and a passageway extending from said socket through the bottom thereof, means engaging under the sides of said insulator for supporting the same, conductor supporting means passing through the opening in said insulator and having a portion thereof seated within said socket, a washer in said socket, means for permitting relative movement of said insulator and said conductor supporting means, and relatively yielding means on the upper and lower contact areas of said insulator for preventing surface stresses therein.

4. A device of the class described, comprising in combination an insulator, mechanism for supporting a conductor arranged to exert compressive strains on said insulator and permit floating action of the conductor, comprising a housing engaging under said insulator, a bolt extending loosely through an opening in said insulator and arranged to suspend the conductor, a head on said bolt positioned within a socket in the upper side of said insulator, a bearing washer engaging beneath said head and yielding means on the contact areas of said insulator for preventing surface stresses therein.

5. A conductor suspension mechanism, comprising in combination a housing open at the top and having an opening through the bottom, an insulator seated in said housing, a skirt on said insulator extending through said opening, yielding means interposed between said housing and said insulator, a concavity in the top of said insulator and an opening from said concavity through the central portion of said insulator, a concave washer fitted in the top of said insulator, resilient means interposed between said washer and said insulator, a conductor supporting bolt passing loosely through the opening in said insulator and extending from the lower end thereof, a head on the upper end of said bolt engaging said washer, and insulating sealing means forming a cap over said insulator.

6. A conductor suspension mechanism, comprising in combination a housing open at the top and having an opening through the bottom, an insulator seated in said housing, a skirt on said insulator extending through said opening, yielding means interposed between said housing and said insulator, a concavity in the top of said insulator and an opening from said concavity through the central portion of said insulator, a concave washer fitted in the top of said insulator, resilient means interposed between said washer and said insulator, a conductor supporting bolt passing loosely through the opening in said insulator and extending from the lower end thereof, a head on the upper end of said bolt engaging said washer, insulating sealing means forming a cap over said insulator, a conductor clamping means on the lower end of said bolt, and means for vertically adjusting said clamping means.

7. A conductor suspension mechanism, comprising in combination a housing open at the top and having an opening through the bottom, an insulator seated in said housing, a skirt on said insulator extending through said opening, yielding means interposed between said housing and said insulator, a concavity in the top of said insulator and an opening from said concavity through the central portion of said insulator, a concave washer fitted in the top of said insulator, resilient means interposed between said washer and said insulator, a conductor supporting bolt passing loosely through the opening in said insulator and extending from the lower end thereof, a head on the upper end of said bolt engaging said washer, insulating sealing means forming a cap over said insulator, a conductor clamping means on the lower end of said bolt, means for vertically adjusting said clamping means, and gripping members on said clamping means arranged to permit longitudinal movement of the conductor.

8. A conductor supporting device, arranged to permit floating action of the conductor, comprising a supporting housing, an insulator therein having a portion extending through the bottom thereof, a socket in said insulator, a bolt passing through an opening in said insulator and extending beyond the bottom end thereof, means for permitting relative movement of said bolt and said insulator, means for preventing surface stresses on said insulator, conductor clamping means on the lower end of said bolt, and means for vertically adjusting said clamping means.

9. A conductor supporting device, arranged to permit floating action of the conductor, comprising a supporting housing, an insulator therein having a portion extending through the bottom thereof, a socket in said insulator, a bolt passing through an opening in said insulator and extending beyond the bottom end thereof, means for permitting relative movement of said bolt and said insulator, means for preventing surface stresses on said insulator, conductor clamping means on the lower end of said bolt, means for vertically adjusting said clamping means, and gripping members on said clamping means arranged to permit longitudinal movement of the conductor.

10. A conductor suspension mechanism, comprising in combination a housing open at the top and having an opening through the bottom, an insulator seated in said housing, a skirt on said insulator extending through said opening, bearing means interposed between said housing and said insulator, a concavity in the top of said insulator and an opening from said concavity through the central portion of said insulator, a concave washer fitted in the top of said insulator, resilient means interposed between said washer and said insulator, a conductor supporting bolt passing loosely through the opening in said insulator and extending from the lower end thereof, a head on the upper end of said bolt engaging said washer, insulating sealing means forming a cap over said insulator, and conductor clamping means carried by the portion of the bolt outside of the insulator.

11. A device of the class described, comprising in combination an insulator, a vertical opening through said insulator, a concave socket in the upper side of said insulator, a conductor supporting bolt passing loosely through said insulator and having a convex head engaging within said concave socket, an insulating covering over said insulator, and a housing for said insulator having therein yielding supporting means for said insulator.

12. A rail support comprising a supporting member, rail gripping means carried by the supporting member, said rail gripping means including means for gripping a flange of the rail at the top and at the bottom thereof and holding the same against movement lengthwise of the support while permitting longitudinal movement of the rail.

13. A strain insulator comprising a supporting housing, an insulator within the housing, a bolt supported within said housing by said insulator and extending outside of the housing, said bolt being freely movable with respect to said housing, said housing having a cup shaped bottom portion extending under the insulator and having an opening at the center thereof and said insulator being supported by said cup shaped bottom and having a portion thereof extending through the opening, said insulator having a central bore therein through which said bolt extends.

14. A strain insulator comprising a supporting housing, an insulator within the housing, a bolt supported by said insulator and extending outside of the housing, said bolt having a limited degree of universal movement with respect to said housing, said housing having a cup shaped bottom portion extending under the insulator and having an opening at the center thereof and said insulator being supported by said cup shaped bottom and having a central bore therein through which said bolt extends.

15. A device of the class described, comprising in combination an insulator having a vertical opening therethrough, a concave socket in the upper side of said insulator, a conductor supporting bolt passing loosely through said insulator and having a convex head engaging within said socket, an insulating covering over said insulator, a housing for said insulator having therein yielding supporting means for said insulator, and a metallic covering for said housing having an eye thereon arranged to support said device.

16. A strain insulator assembly, comprising in combination a stress bolt having a head thereon, an insulator element molded over said head and the upper portion of said bolt, a supporting housing for said insulator element, and a washer molded onto said insulator and arranged to engage said housing, said insulator being supported in the housing to permit relative floating movement of said insulator with respect to said housing.

17. A strain insulator assembly, comprising in combination a stress bolt having a head thereon, an insulator element, molded over said head and the upper portion of said bolt, a supporting housing enclosing the upper portion of said insulator element, a washer molded onto said insulator and arranged to engage said housing, said insulator having a limited degree of floating movement with respect to said housing, said housing being split into two portions, and means for clamping said portions together.

18. A strain insulator assembly, comprising in combination a two-piece housing having a supporting eye therefor, cooperating engaging means for securing the portions of said housing together, an insulator having an enlarged upper portion and a reduced neck portion, a stress bolt having a head supported in a socket in the upper portion of said insulator, said housing loosely embracing the upper portion of said insulator and surrounding the neck thereof, a seat portion on said housing supporting said insulator, and a gasket interposed between the supporting portion of said housing and said insulator.

19. A strain insulator assembly, comprising in combination a two-piece housing having a supporting eye therefor, cooperating engaging means for securing the portions of said housing together, an insulator having enlarged upper portion and a reduced neck portion, a stress bolt having a head supported in a socket in the upper portion of said insulator, said housing loosely embracing the upper portion of said insulator and surrounding the neck thereof, a seat portion on said housing supporting said insulator, and a gasket interposed between the supporting portion of said housing and said insulator, said bolt passing through said insulator and extending beyond the lower end thereof and formed at the bottom for supporting an object.

In witness whereof, I hereunto subscribe my name this 3rd day of July, 1928.

WILLIAM HOWARD BOYCE.